US009532265B2

(12) United States Patent
Rácz et al.

(10) Patent No.: US 9,532,265 B2
(45) Date of Patent: Dec. 27, 2016

(54) METHOD AND DEVICE FOR CONGESTION SITUATIONS

(75) Inventors: Sandor Rácz, Cegled (HU); Szilveszter Nádas, Budapest (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 248 days.

(21) Appl. No.: 13/984,374

(22) PCT Filed: Feb. 22, 2011

(86) PCT No.: PCT/SE2011/050196
§ 371 (c)(1),
(2), (4) Date: Aug. 8, 2013

(87) PCT Pub. No.: WO2012/115545
PCT Pub. Date: Aug. 30, 2012

(65) Prior Publication Data
US 2013/0315063 A1    Nov. 28, 2013

(51) Int. Cl.
*H04L 12/26* (2006.01)
*H04W 28/02* (2009.01)
*H04L 12/823* (2013.01)

(52) U.S. Cl.
CPC .......... *H04W 28/0289* (2013.01); *H04L 47/32* (2013.01); *H04W 28/0247* (2013.01); *H04W 28/0284* (2013.01)

(58) Field of Classification Search
CPC ............... H04W 28/0289; H04W 28/0268; H04W 28/0215; H04W 28/0236; H04W 48/06; H04W 24/02; H04W 48/16; H04W 88/06; H04W 40/02; H04W 8/02

(Continued)

(56) References Cited

U.S. PATENT DOCUMENTS

2003/0206534 A1   11/2003   Wu
2004/0218617 A1*  11/2004   Sagfors ............... H04L 41/0896
                                                               370/412

(Continued)

FOREIGN PATENT DOCUMENTS

EP    1 100 285    5/2001
EP    2 273 736    1/2011

(Continued)

OTHER PUBLICATIONS

International Search Report for PCT/SE2011/050196, mailed Nov. 17, 2011.

(Continued)

*Primary Examiner* — Andrew Chriss
*Assistant Examiner* — Atique Ahmed

(57) ABSTRACT

A Radio Network Controller, an RNC (105), for an HSPA enabled cellular access system. The RNC is arranged to be connected to a Radio Base Station (110) by a Transport Network (120) through which the RNC (105) sends and receives traffic to and from UEs (115). The RNC (105) comprises a function (210) for Radio Link Control, RLC, for the UEs, and is arranged to detect congestion in the Transport Network (120) to or from each UE. The RNC (105) is arranged to, when detecting congestion in the Transport Network (120) to or from a UE (115), use its RLC function (210) to discard an RLC Service Data Unit, SDU, in a receive buffer, the receive buffer being in the UE (115) if the congestion is in the direction to the UE (115) and in the RNC (105) if the congestion is in the direction from the UE (115).

18 Claims, 4 Drawing Sheets

(58) Field of Classification Search
USPC .................................. 370/230, 328, 473, 412
See application file for complete search history.

(56) References Cited

U.S. PATENT DOCUMENTS

| | | | |
|---|---|---|---|
| 2006/0268689 A1 | 11/2006 | Tarraf et al. | |
| 2007/0133605 A1* | 6/2007 | Herrmann | H04L 1/1812 370/473 |
| 2008/0084822 A1* | 4/2008 | Sagfors | H04L 43/0852 370/235 |
| 2011/0038316 A1* | 2/2011 | Hatakeyama | H04L 1/1809 370/328 |
| 2011/0164560 A1* | 7/2011 | Ki | H04L 1/1874 370/328 |
| 2011/0170429 A1* | 7/2011 | Cao | H04L 47/122 370/252 |

FOREIGN PATENT DOCUMENTS

| WO | 2006/037378 A1 | 4/2006 |
|---|---|---|
| WO | WO 2006/108282 | 10/2006 |
| WO | WO 2009/058084 | 5/2009 |
| WO | WO 2010/107355 | 9/2010 |

OTHER PUBLICATIONS

Written Opinion for PCT/SE2011/050196, mailed Nov. 17, 2011.
Supplementary European Search Report mailed Nov. 20, 2013 in EP application 11859291.4.

* cited by examiner

METHOD AND DEVICE FOR CONGESTION SITUATIONS

This application is the U.S. national phase of International Application No. PCT/SE2011/050196 filed 22 Feb. 2011 which designated the U.S., the entire content of which is hereby incorporated by reference.

TECHNICAL FIELD

The present invention discloses a method and a device for improved congestion handling in a Traffic Network in a cellular access system.

BACKGROUND

In cellular access systems, the Radio Base Station, the RBS, is connected to the Radio Network Controller, the RNC, by means of the so called Traffic Network, the TN. Thus, traffic between the RNC and the User Equipments, UEs, which are connected to a particular RBS is transported from that RBS through the TN to the RNC.

Since all traffic from the UEs is transported to the RNC via the TN, the TN is a potential bottleneck in congestion situations. Accordingly, an RNC for a cellular access system should comprise a solution for TN congestion detection and handling.

SUMMARY

It is an object of the present invention to obtain an improved solution to TN congestion detection and handling in a cellular access system, with emphasis on HSPA enabled cellular access systems.

This object is achieved by the present invention in that it discloses a Radio Network Controller, an RNC, for an HSPA enabled cellular access system. The RNC is arranged to be connected to a Radio Base Station by means of a Transport Network through which the RNC is arranged to send and receive traffic to and from a plurality of User Equipments, UEs.

The RNC comprises a function for Radio Link Control, RLC, for the UEs in question, and is arranged to detect congestion in the Transport Network to or from each of the UEs.

The RNC is arranged to, when it detects congestion in the Transport Network to or from a UE, use its RLC function to discard an RLC Service Data Unit, SDU, in a receive buffer, which receive buffer is in the UE if the congestion is in the direction to the UE and in the RNC if the congestion is in the direction from the UE.

Thus, by means of the RNC of the invention, if there is congestion in either direction, then an RLC SDU can be discarded, i.e. "dropped", in a receive buffer at the end of the connection between the RNC and the UE that is affected by the congestion.

In embodiments, the RNC is arranged to, in the case of congestion in the direction to the UE, use its RLC function to discard the oldest RLC SDU in the receive buffer in the UE.

In embodiments, the RNC is arranged to use its RLC function to discard the RLC SDU in the receive buffer in the UE by means of sending an RLC Protocol Data Unit, PDU, to the UE, with the command Move Receiver Window. In some such embodiment, the RNC is arranged to use the Super Field for the command Move Receiver Window. In some such embodiments, the RNC is arranged to discard the oldest RLC SDU from its RLC SDU transmit buffer if it does not receive an acknowledgement of the command Move Receiver Window from the UE within a predefined interval of time.

In embodiments, the RNC is arranged to detect congestion in the direction to the UE by means of receiving, from the RBS, a Capacity Allocation, CA, control frame with a congestion indication flag.

In embodiments, the RNC is arranged to detect congestion in the direction from the UE by means of detecting a missing Iub Frame Protocol Sequence Number.

In embodiments, the RNC is arranged to use its RLC function to discard an SDU in the RLC receive buffer in the RNC if it detects congestion in the direction from the UE.

In embodiments, the RNC is arranged to transmit RLC ACKs to the UE for Protocol Data Units, PDUs, which belong to a discarded SDU in the RLC receive buffer in the RNC.

The invention also discloses a method of operating an RNC which is arranged to function as described above. Thus, the method is intended for use in a Radio Network Controller, an RNC, in an HSPA enabled cellular access system.

The method comprises connecting the RNC to a Radio Base Station by means of a Transport Network and sending and receiving traffic to and from a plurality of User Equipments, UEs, through the Transport Network.

In addition, the method comprises equipping the RNC with a function for Radio Link Control, RLC, for the UEs in question, and arranging the RNC to detect congestion in the Transport Network to or from each of the UEs.

According to the method, if the RNC detects congestion in the Transport Network to or from a UE, it uses its RLC function to discard an RLC Service Data Unit, SDU, in a receive buffer, which is a receive buffer in the UE if the congestion is in the direction to the UE, and a receive buffer in the RNC if the congestion is in the direction from the UE.

BRIEF DESCRIPTION OF THE DRAWINGS

The invention will be described in more detail in the following, with reference to the appended drawings, in which.

DETAILED DESCRIPTION

Figure 1:
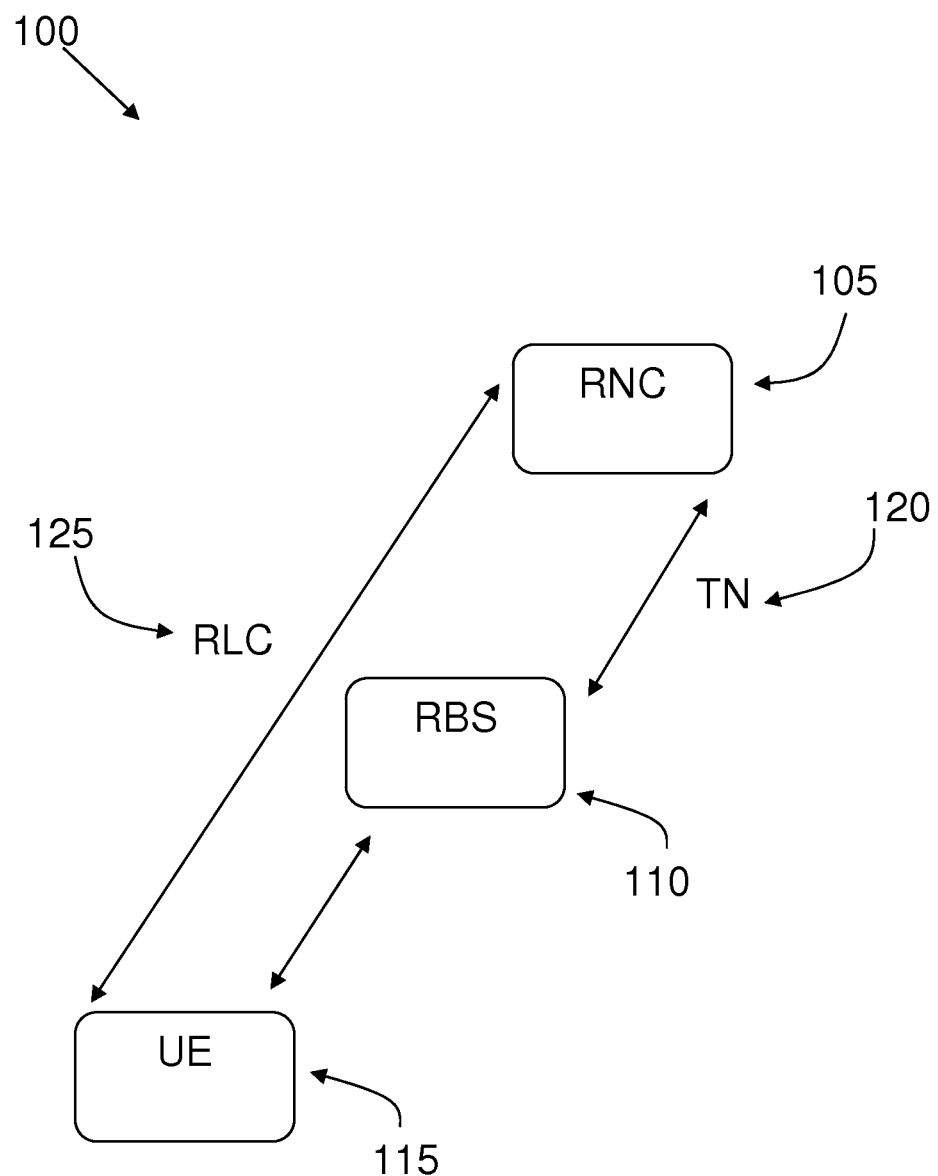
FIG. 1 shows as schematic view of a system in which the invention is applied.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

FIG. 1 shows a schematic overview of a system 100 in which the invention is applied. The system 100 is a cellular access system enabled for HSPA, High Speed Packet Access, and comprises one or more Radio Network Controllers, RNCs, one of which is shown as 105 in FIG. 1. The RNC 105 is connected to a NodeB 110, generically also sometimes referred to as a Radio Base Station, abbreviated as RBS. The connection between the RNC 105 and the RBS 110 is by means of a so called Transport Network, TN, 120. All traffic to and from a number of User Equipments, UEs 115, is routed through the RBS 110, and is then sent to the RNC 105 via the TN 120. Although FIG. 1 only shows the RNC 105 being connected to one RBS 110 and its UEs 115, an RNC can be, and usually is, connected to more than one RBS at a time, where each RBS has its associated number of UEs.

Figure 2:
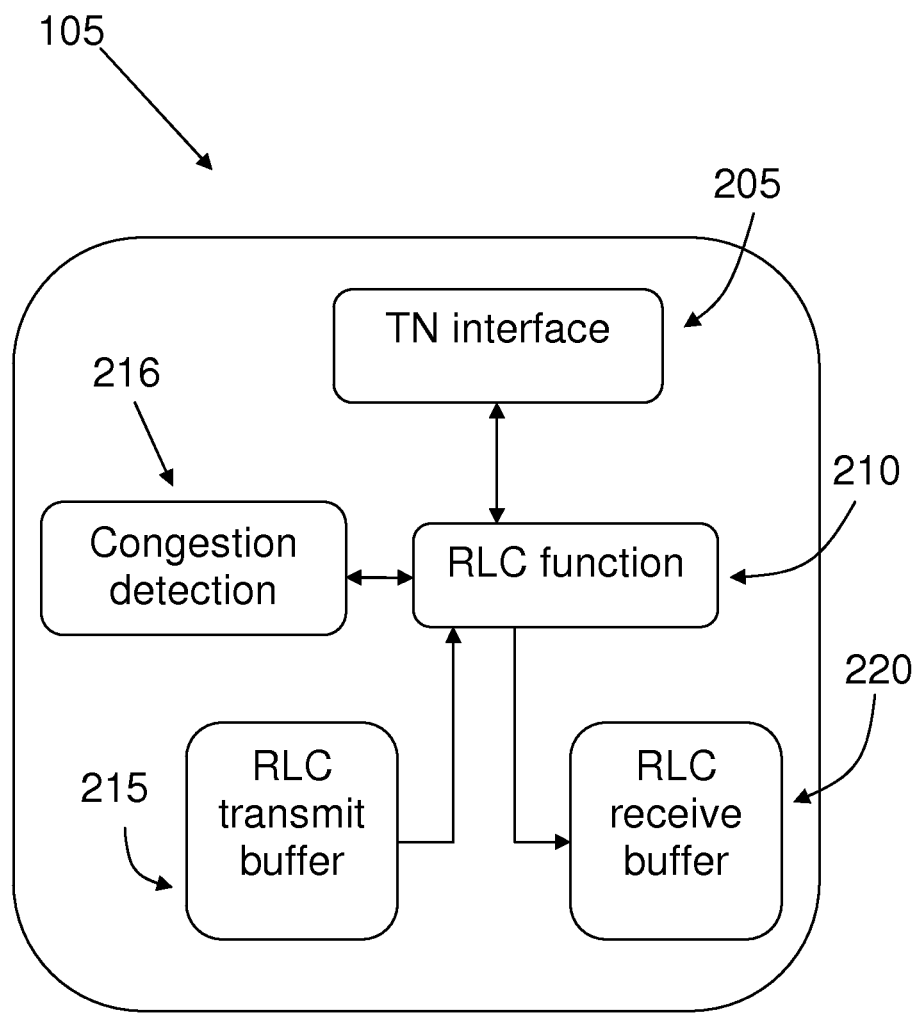
FIG. 2 shows a schematic block diagram of an RNC of the invention.

Due to the way that the TN 120 is utilized, as described above, the TN 120 is a potential bottleneck in the system 100. FIG. 2 shows a schematic block diagram of an RNC 105 of the invention, which is arranged to detect and handle TN congestion situations.

As shown in FIG. 2, the RNC 105 comprises an interface 205 to the TN. In order to handle congestion situations, either to or from the UEs, i.e. in Up Link, UL, (from the UEs) or in Down Link, DL, (to the UEs), the RNC 105 is arranged to detect congestion in both UL and DL, for example by means of a special congestion detection function shown as 216 in FIG. 2. The congestion detection function 216 can work in a variety of different manners, which will be described later in this text.

The RNC 105 also comprises a function 210 for Radio Link Control, RLC, for the UEs whose UL and DL traffic is sent via the TN 120. The RLC function comprises a transmit buffer 215 and a receive buffer 220 for RLC SDUs, Service Data Units. Corresponding RLC SDU send and transmit buffers can be found in the UEs.

When the RNC 105, by means of the detecting congestion function 216, detects congestion in the TN 120 in the direction to (DL) or from (UL) a UE, the RNC 115 uses its RLC function 210 to discard an RLC Service Data Unit, SDU, in a receive buffer.

Depending on which direction that the detected TN congestion is in, i.e. UL or DL, the receive buffer in which an RLC SDU is discarded, is either in the UE 115, if the congestion is in the DL direction, or in the RNC 105 if the congestion is in the UL direction.

In the case of TN congestion in the direction to the UEs from the RNC, i.e. DL, the RNC 105 is arranged to use its RLC function 210 to discard the oldest RLC SDU in the receive buffer in the UE 115, which is suitably done in the following manner: the RNC 105 uses its RLC function 210 to discard the oldest RLC SDU in the receive buffer in the UE 115 by means of sending an RLC Protocol Data Unit, PDU, to the UE 115, which contains the command Move Receiver Window. Suitably, the RNC 105, by means of its RLC function 210 uses the Super Field in the RLC PDU for the command Move Receiver Window.

In addition, if the RLC 105 does not receive an acknowledgement of the command Move Receiver Window from the UE 115 within a predefined interval of time, the RNC 105 is preferably arranged to discard the oldest RLC SDU from its RLC SDU transmit buffer. Examples of such intervals of time are suitably in the interval of 100-400 ms.

Regarding the nature of the congestion detection function 216, this function can be obtained in a number of ways. Detection of congestion in the DL direction, i.e. to the UEs, is in one embodiment obtained by means of receiving in the RNC 105, from the RBS 110, a Capacity Allocation, CA, control frame with a congestion indication flag, which this indicates TN congestion in the direction to the UE. The RBS 110 detects TN congestion in the DL direction by means of detecting gaps in the Iub Frame Protocol Sequence Numbers or, alternatively, by means of so called ECN, Explicit Congestion Notification, and after such detections of DL TN Congestion, the RBS 110 sends a CA control frame with a congestion indication flag to the RNC 105.

When it comes to the congestion detection function's ability to detect TN congestion in the direction from the UE, i.e. in the UL direction, this is suitably achieved by means of detecting one or more missing Iub Frame Protocol Sequence Number in the traffic from the UE 115, so that the congestion detection function 216 is made to observe UL Iub Frame Protocol Sequence Numbers in order to detect any missing such numbers. A missing Iub Frame Protocol Sequence Number in the UL direction indicates that a PDU (or, more precisely, one or more PDUs that were carried by that Iub FP data frame), a Protocol Data Unit, has been lost in the UL direction, and accordingly, that the SDU that contains the PDU in question has been destroyed or partially lost, since an SDU contains one or more PDUs. Hence, if an SDU is correctly received, this means that all of its PDUs have been received correctly. An SDU which has been destroyed is discarded from the RLC receive buffer in the RNC by means of using the RLC function in the RNC 105.

In addition to dropping SDUs in the RNC in the case of UL TN congestion, the RNC 105 is also suitably arranged to transmit RLC ACKs to the UE 115 for Protocol Data Units, PDUs, which belong to a discarded SDU in the RLC receive buffer. In this manner, no retransmissions from the UE will be made for UL SDUs which have been dropped in the RNC due to UL TN congestion, which will help in improving the jitter performance in the UL.

As an alternative to using detecting TN congestion in the UL by means of missing Iub Frame Protocol Sequence Number in the traffic from the UE, so called Explicit Congestion Notification can also be used in the Congestion Detection Function 216 for detecting UL TN congestion.

Figure 3:
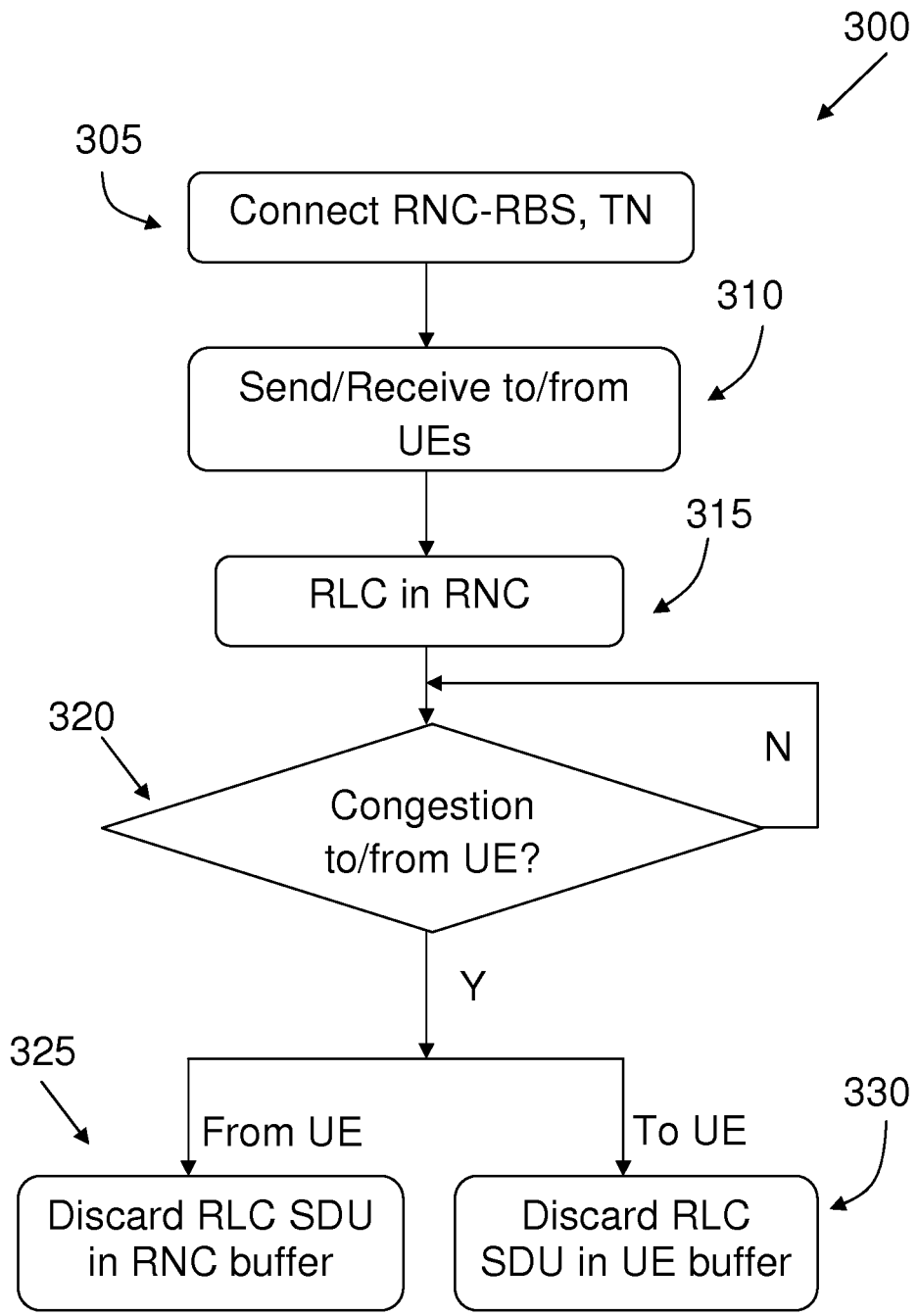
FIG. 3 shows a flow chart of a method of the invention.

FIG. 3 shows a schematic flow chart 300 of a method of the invention. The method 300 is intended for use in a Radio Network Controller, an RNC 105, in an HSPA enabled cellular access system, and comprises connecting, step 305, the RNC to a Radio Base Station 110 by means of a Transport Network 120, and sending and receiving traffic, step 310, to and from a plurality of User Equipments, UEs 115 through the Transport Network.

As indicated in step 315, the method 300 comprises equipping the RNC with a function for Radio Link Control, RLC, for the UEs in question, and arranging the RNC to detect congestion, step 320, in the Transport Network to or from each of the UEs in question.

According to the method 300, if the RNC detects congestion in the Transport Network to or from a UE, it uses its RLC function to discard an RLC Service Data Unit, SDU, in a receive buffer, said receive buffer being, step 330, in the UE if the congestion is in the direction to the UE and, step 325, in the RNC if the congestion is in the direction from the UE.

According to embodiments of the method 300, the RNC, in the case of congestion in the direction to the UE, uses its RLC function to discard the oldest RLC SDU in the receive buffer in the UE. According to some such embodiments of the method 300, the RNC uses its RLC function to discard the RLC SDU in the receive buffer in the UE by means of sending an RLC Protocol Data Unit, PDU, to the UE, with the command Move Receiver Window. According to some such embodiments of the method 300, the RNC uses the Super Field for the command Move Receiver Window.

According to some such embodiments of the method 300, the RNC discards the next possible SDU from its RLC SDU transmit buffer if it does not receive an acknowledgement of the command Move Receiver Window from the UE within a predefined interval of time.

In embodiments of the method 300, the RNC detects congestion in the direction to the UE by means of receiving, from the RBS, a Capacity Allocation, CA, control frame with a congestion indication flag.

In other embodiments of the method 300, the RNC detects congestion in the direction to the UE by means of a so called ECN function, Explicit Congestion Notification, by means of which the RNC receives an Explicit Congestion Notification flag, an ECN flag.

Regarding TN congestion in the UL direction, i.e. from the UE, in embodiments of the method 300, the RNC detects congestion in the UL direction by means of detecting a missing Iub Frame Protocol Sequence Number. In some such embodiments of the method 300, the RNC discards an RLC SDU in an RLC receive buffer in the RNC if it detects congestion in the direction from the UE. In some such embodiments of the method 300, the RNC transmits RLC ACKs to the UE for Protocol Data Units, PDUs, which belong to a discarded RLC SDU in the RLC receive buffer.

As an alternative to detecting UL TN congestion by means of missing Iub Frame Protocol Sequence Numbers, so called Explicit Congestion Notification can also be used for detecting UL TN congestion.

Figure 4:
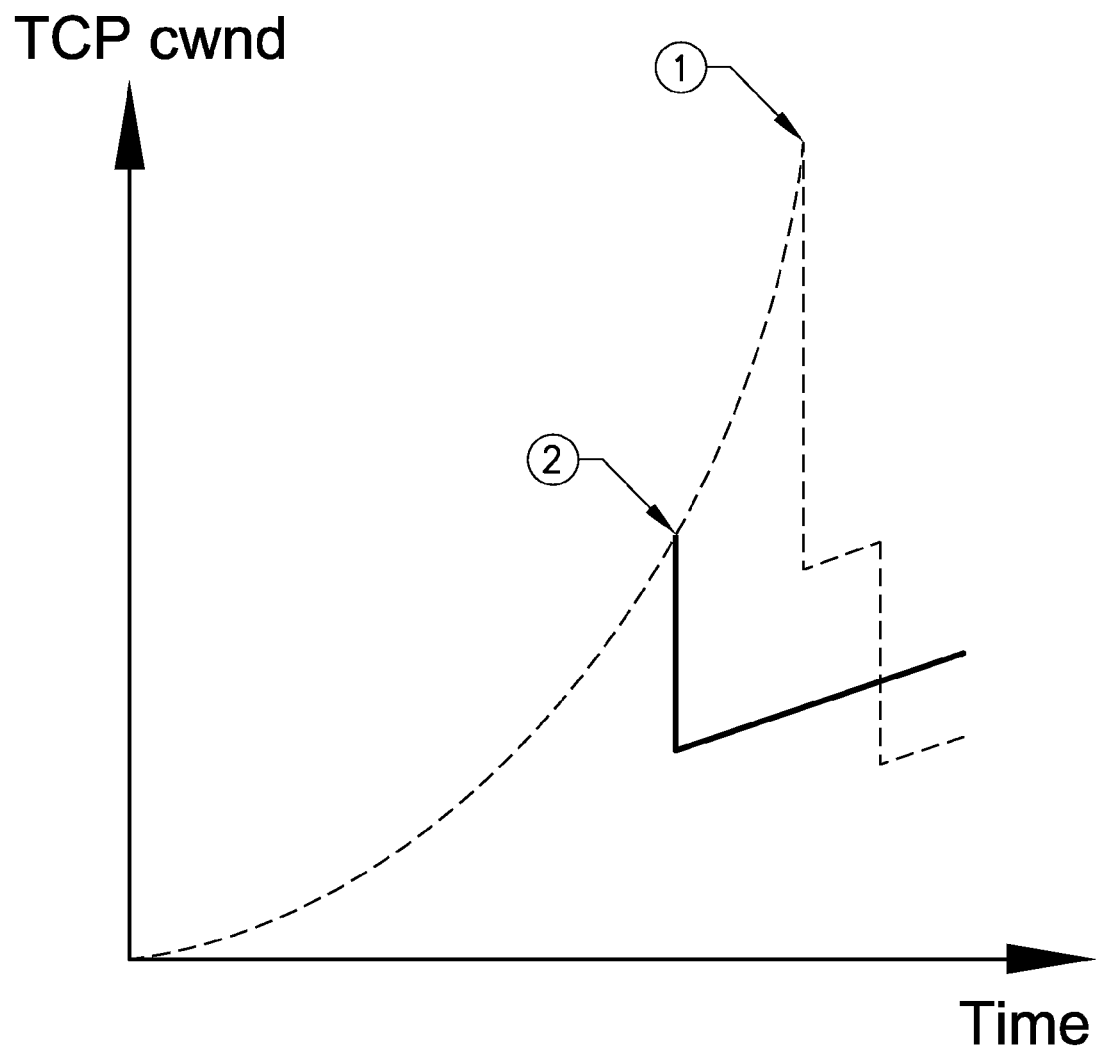
FIG. 4 shows congestion performance with and without the invention.

FIG. 4 shows a comparison of the transient behaviour in an RNC with and without the invention: the arrow with the numeral "1" shows performance in an RNC with prior art congestion detection, and the arrow with the numeral "2" shows performance in an RNC with congestion detection and actions according to the invention. The horizontal axis shows time, and the vertical axis shows the "TCP wnd", i.e. the TCP congestion window, where TCP is the Transport Control Protocol, which can be used in a system such as the one 100 shown in FIG. 1. Both arrows show the RNC's first reaction to TN congestion in the so called "TCP slow start mode".

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A Radio Network Controller, an RNC, for an HSPA enabled cellular access system,
the RNC being arranged to be connected to a Radio Base Station by means of a Transport Network through which the RNC is configured to:
send downlink traffic to a plurality of User Equipments, UEs, and
receive uplink traffic from the plurality of UEs;
the RNC comprising a function for Radio Link Control, RLC, for said UEs, the RNC being arranged to detect downlink traffic or uplink traffic congestion in the Transport Network to or from each of said UEs, respectively,
the RNC being arranged to:
upon detecting downlink traffic congestion in the Transport Network to a UE, use its RLC function to cause an RLC Service Data Unit, SDU, in a receive buffer in the UE to be discarded; and
upon detecting uplink traffic congestion in the Transport Network from a UE, use its RLC function to discard an RLC SDU in a receive buffer in the RNC.

2. The RNC of claim 1, being arranged to, in the case of congestion in the direction to the UE, use its RLC function to discard the oldest RLC SDU in the receive buffer in the UE.

3. The RNC of claim 1, being arranged to use its RLC function to discard said RLC SDU in the receive buffer in the UE by means of sending an RLC Protocol Data Unit, PDU, to the UE, with the command Move Receiver Window.

4. The RNC of claim 3, being arranged to use the Super Field for the command Move Receiver Window.

5. The RNC of claim 1, being arranged to discard the oldest RLC SDU from its RLC SDU transmit buffer if it does not receive an acknowledgement of the command Move Receiver Window from the UE within a predefined interval of time.

6. The RNC of claim 1, being arranged to detect congestion in the direction to the UE by means of receiving, from the RBS, a Capacity Allocation, CA, control frame with a congestion indication flag.

7. The RNC of claim 1, being arranged to detect congestion in the direction from the UE by means of detecting a missing Iub Frame Protocol Sequence Number.

8. The RNC of claim 1, being arranged to use its RLC function to discard an SDU in an RLC receive buffer in the RNC if it detects congestion in the direction from the UE.

9. The RNC of claim 8, being arranged to transmit RLC ACKs to the UE for Protocol Data Units, PDUs, which belong to a discarded SDU in the RLC receive buffer.

10. A method for use in a Radio Network Controller, an RNC, in an HSPA enabled cellular access system, comprising:
- connecting the RNC to a Radio Base Station by means of a Transport Network; and
- sending downlink traffic to a plurality of User Equipments, UEs through the Transport Network;
- receiving uplink traffic from the plurality of UEs through the Transport network; equipping the RNC with a function for Radio Link Control, RLC, for said UEs, and
- detecting downlink traffic or uplink traffic congestion in the Transport Network to or from each of said UEs, respectively,
- upon detecting downlink traffic congestion in the Transport Network using the RLC function to cause an RLC Service Data Unit, SDU, in a receive buffer in the UE to be discarded and
- upon detecting uplink traffic congestion in the Transport Network, using the RLC function to discard an RLC SDU in a receive buffer in the RNC.

11. The method of claim 10, further comprising the RNC, in the case of congestion in the direction to the UE, uses its RLC function to discard the oldest RLC SDU in the receive buffer in the UE.

12. The method of claim 10, further comprising the RNC using the RLC function to discard said RLC SDU in the receive buffer in the UE by means of sending an RLC Protocol Data Unit, PDU, to the UE, with the command Move Receiver Window.

13. The method of claim 12, further comprising the RNC using the Super Field for the command Move Receiver Window.

14. The method of claim 10, further comprising the RNC discarding the next possible SDU from its RLC SDU transmit buffer if it does not receive an acknowledgement of the command Move Receiver Window from the UE within a predefined interval of time.

15. The method of claim 10, further comprising the RNC detecting congestion in the direction to the UE by means of receiving, from the RBS, a Capacity Allocation, CA, control frame with a congestion indication flag.

16. The method of claim 10, further comprising the RNC detecting congestion in the direction from the UE by means of detecting a missing Iub Frame Protocol Sequence Number.

17. The method of claim 10, further comprising the RNC discarding an RLC SDU in an RLC receive buffer in the RNC if it detects congestion in the direction from the UE.

18. The method of claim 17, further comprising the RNC transmitting RLC ACKs to the UE for Protocol Data Units, PDUs, which belong to a discarded RLC SDU in the RLC receive buffer.

* * * * *